(12) United States Patent
Wang et al.

(10) Patent No.: US 6,526,155 B1
(45) Date of Patent: Feb. 25, 2003

(54) SYSTEMS AND METHODS FOR PRODUCING VISIBLE WATERMARKS BY HALFTONING

(75) Inventors: Shen-ge Wang, Fairport, NY (US); Keith T. Knox, Brighton, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/449,356

(22) Filed: Nov. 24, 1999

(51) Int. Cl.[7] ................................................. G06K 9/00
(52) U.S. Cl. ........................ 382/100; 382/237; 358/3.14
(58) Field of Search ................................ 382/100, 237; 356/3.06, 3.14

(56) References Cited

U.S. PATENT DOCUMENTS

| | | | | |
|---|---|---|---|---|
| 5,315,098 A | * | 5/1994 | Tow | 235/469 |
| 5,530,759 A | * | 6/1996 | Braudaway et al. | 380/54 |
| 5,710,636 A | * | 1/1998 | Curry | 235/494 |
| 5,790,703 A | * | 8/1998 | Wang | 235/494 |
| 6,088,123 A | * | 7/2000 | Adler et al. | 358/3.13 |

OTHER PUBLICATIONS

Embedding the Attribute Information into a Dithered Image, Kiyoshi Tanaka et al., Systems and Computers in Japan vol. 21, No. 7, 1990, pp. 43–50.*
A Unified Coding Method of Dithered Images and Text Data Using Micropatterns, Yasuhiro Nakamura et al., Communications in Japan, Part 1, vol. 4, 1989 pp. 50–56.*

* cited by examiner

*Primary Examiner*—Jon Chang
*Assistant Examiner*—Charles Kim
(74) *Attorney, Agent, or Firm*—Oliff & Berridge, PLC

(57) ABSTRACT

Visible digital watermarks enable a robust tracking method to be associated with one or more input images. Specifically, by modifying a halftone screen within a certain area by setting a gray-scale range within that area to a threshold, and halftoning an input image based on this modified halftone screen, visible watermarks can be embedded into an input image.

20 Claims, 3 Drawing Sheets

SYSTEMS AND METHODS FOR PRODUCING VISIBLE WATERMARKS BY HALFTONING

BACKGROUND OF THE INVENTION

1. Field of Invention

This invention is directed to systems and methods for embedding visible watermarks.

2. Description of Related Art

Methods for protecting copyrightable works have evolved from a simple designation below the works to highly complex methods for embedding watermarks in the work. Watermarking can take two basic forms: visible and invisible. Examples of visible watermarks are the commonly-seen copyright logos or symbols that are generally affixed to the work before sales or distribution. Especially in the case of images, the presence of the watermark is very visible, and is generally difficult to remove without damaging the image. Generally speaking, visible watermarks do not harm the image, while providing a very robust form for encoding information in the image.

Invisible watermarks can encompass the standard and commonly used copyright logos or symbols, as well as company logos, serial numbers, or general identification marks and/or encrypted data. These invisible watermarks are embedded into the work in a way which is not generally discernible without the aid of visualization device such as a key or computer. Theoretically, these embedded images can be retrieved from the work at any time in the works' history or from any other form or embodiment into which the work may have been translated. This allows the owner to track the work and clearly establish ownership rights when those rights are in dispute. Furthermore, since the embedded watermark image is essentially invisible to the unaided eye, the likelihood of tampering with or removal of the watermark is reduced.

Invisible watermarks, by definition, are essentially invisible to the unaided eye. Therefore, to retrieve such an invisible watermark, usually a hardware or a software technique needs to be applied to the watermarked image in order to retrieve the embedded information.

SUMMARY OF THE INVENTION

This invention provides systems and methods for embedding visible watermarks in images or documents.

This invention further provides systems and methods that allow visible watermarks to be embedded in images through a halftoning process.

This invention also provides systems and methods for modifying a halftone screen when the halftone screen contains the watermark to be embedded in a halftone image.

Embedding of visible watermarks is accomplished by altering a halftone screen prior to halftoning of an input image. Specifically, by modifying all threshold values within a specified area of halftone screen, and setting the gray-scale range to a constant value within this range, any existing halftone screen, e.g., clustered halftone screens or dispersed halftone screens, can be converted to a halftone screen that produces visible digital watermarks in the output halftoned image. The visible watermarks will appear in the output image as symbols defined by the specified area where the halftone screen was modified through the selected gray-scale range. Thus, the watermark is visually apparent within the output image and is very difficult to remove.

In particular, using an existing halftone screen, a portion of the screen is identified as an area which will correspond to the visible watermarks in the output image. The area can correspond to a letter, a word, a logo, a symbol, a signature, a pattern, a texture, or any other indicia a user desires to reproduce in the output image. In addition to selecting the area in which the visible watermarks will appear, a gray-scale range is selected such that the watermarks will only be shown when the values of the input-image fall into this range. For example, to convert an existing halftone screen to a screen for visible watermarks, the threshold values of the halftone screen within the specified area and within the selected gray-scale range are replaced by, for example, the upper limit of the selected range, for example in a 256 gray level image, 255, Those threshold values of the halftone screen within the specified area, that are not within the selected gray-scale range, are not changed. Therefore the specified area changes brightness but does not change to a solid, uniform output gray level. When the input gray values lie within the selected range, for example between 160 and 200, the halftone output by the modified screen inside the specified area will show no difference from the constant input equal to, for example, 161. Thus, the background, which is outside the specified area, varies as the halftone output by the unmodified screen. Therefore, the contrast between the inside and the outside areas makes the watermark visible.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures wherein.

DETAILED DESCRIPTION OF PREFERRED EMBODIMENTS

Figure 1:
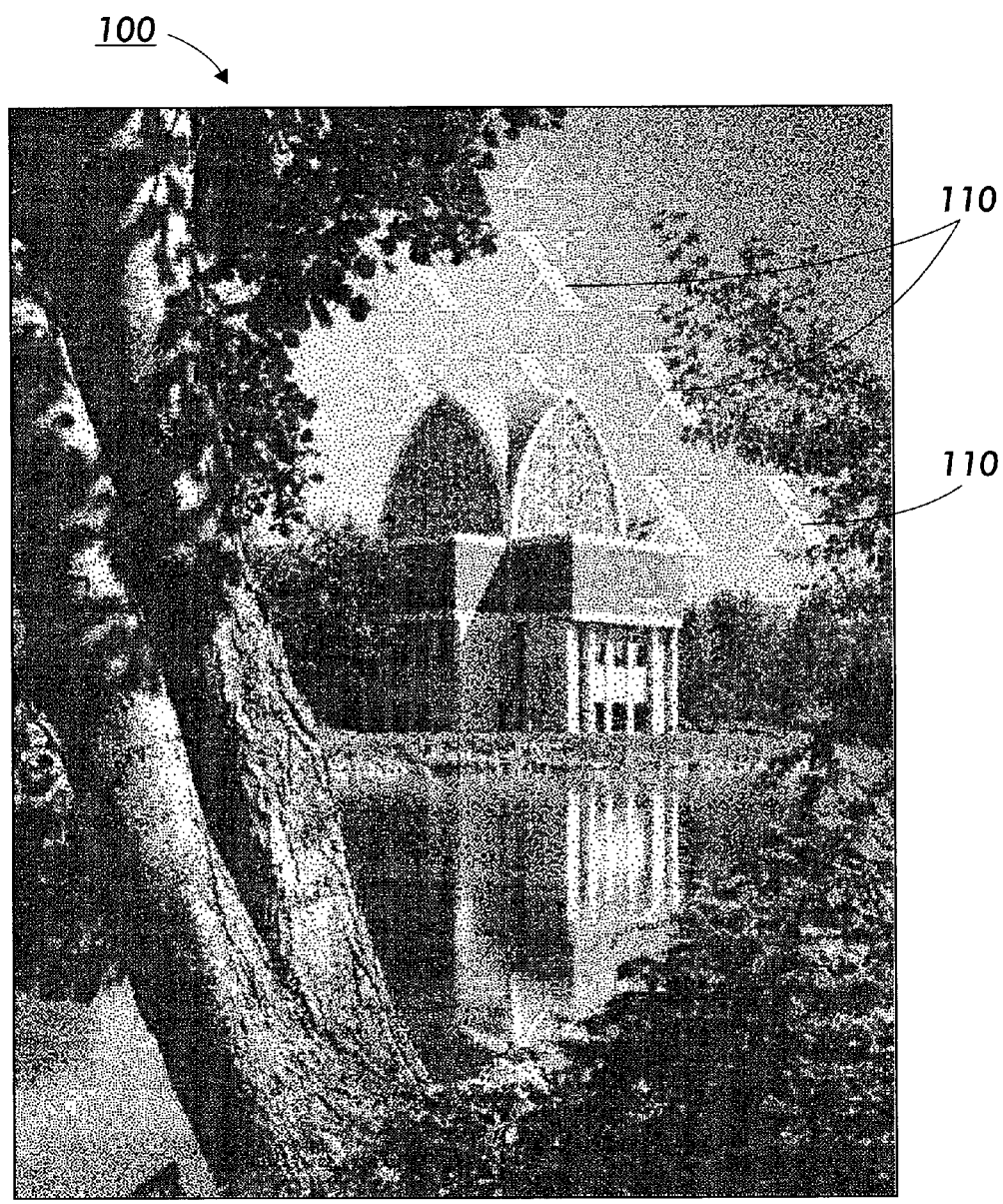
FIG. 1 is an exemplary halftoned image containing a visible watermark.

FIG. 1 illustrates an exemplary image 100 containing the visible watermarks 110 formed in accordance with the systems and methods of this invention. Here, the visible watermarks 110 illustratively appear as an "X logo" throughout a portion of the image 100. These visible watermarks 110 illustratively appear lighter than their adjacent background.

Figure 2:
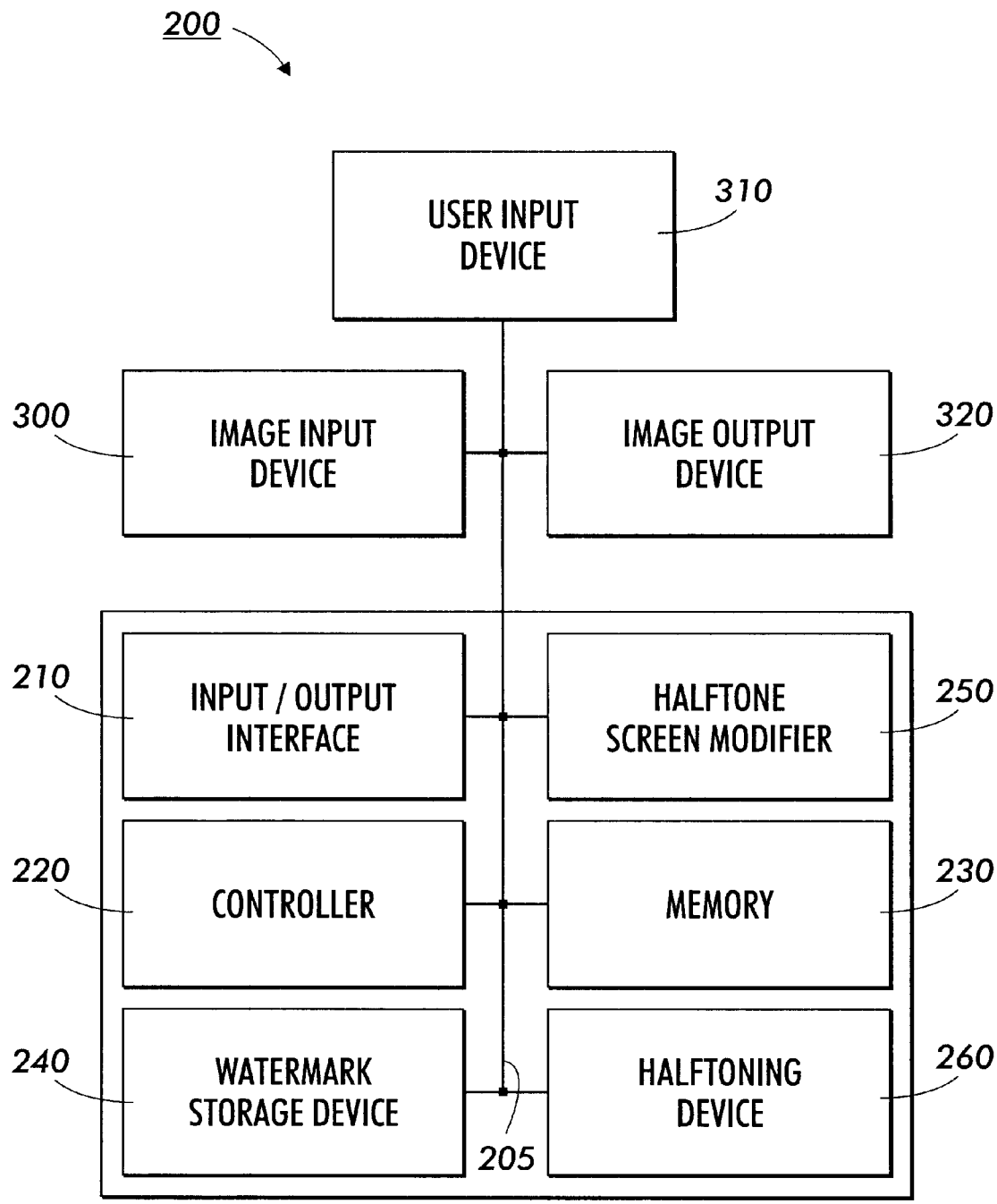
FIG. 2 is a functional block diagram of a watermark embedding device according to this invention.

FIG. 2 shows a watermark embedding device 200 for embedding watermarks in an input image according to this invention. As shown in FIG. 2, an input image is input from an image input device 300 over a link 205 to the watermark embedding device 200. It should be appreciated that the image input device 300 can be any device that stores and/or generates an electronic version of an image.

Thus, the image can be a printed hard copy version of the image, and the image input device 300 can be a scanner that scans and outputs an electronic version of the image over the link 205 to the watermark embedding device 200. Furthermore, the image input device 300 and the watermark embedding device 200 can be elements integrated into a photocopier.

Similarly, the image input device 300 can be a server or other node on a local area network, a wide area network, an intranet, the Internet or any other distributed network. In this case, the image is already stored on the network in electronic form.

Finally, the link 205 can be a wired or wireless link to the image input device 300. Thus the image input device 300 and the link 205 can be any known or later developed elements that are capable of supplying an electronic image to the watermark embedding device 200.

As discussed above, the system and methods of this invention work equally well on images that have not been transferred to hard copy. In this case, the image is already in digital form and the image is ready for processing by the watermark embedding device 200.

The watermark embedding device 200 includes an I/O interface 210, a controller 220, a memory 230, a watermark storage device 240, a halftone screen modifier 250 and a halftoning device 260. Connected to the watermark embedding device 200 is an image input device 300, a user input device 310 and an image output device 320.

In operation, an image is received from the image input device 300, via link 205 and the I/O interface 210, in the watermark embedding system 200. The I/O interface 220 forwards the input image data received from the image input device, under the direction of the controller 220, to the memory 230. Upon selection of a watermark by a user with the input device 310, the criteria for the watermark are retrieved from the watermark storage device 240 and forwarded to the halftone screen modifier 250. The halftone screen modifier 250 modifies a halftone screen based on the received watermark criteria from the watermark storage device 240. The halftoning device 260, using the modified halftone screen produced by the halftone screen modifier, then halftones the input image embedding the visible watermark. The image containing the visible watermark is then output, via I/O interface 210 and link 205, to the image output device 320.

It should be appreciated that the image output device 320 can be any device or combination of devices that outputs or displays the resulting image data. Thus, the resulting image can be a printed version of the input image, and the output device 320 can be a printer. Similarly, the output device 320 can be a monitor which is capable of displaying the electronic version of the resulting image for viewing. Furthermore, the image input device 300, the watermark embedding device 200, and the image output-device 320 can be elements integrated into a single device, such as a photocopier.

Similarly, the image output device 320 can be a server or other node on a local area network, a wide area network, an intranet, the Internet, or any other distributed network. In this case, the resulting image is transferred and stored on the network in electronic form. Finally, the link 205 can be a wired or wireless link to the image output device 320 or any other image output device or display device or to the network. Thus, the image output device 320 and the link 205 can be any known or later developed systems and methods that are capable of receiving and outputting or storing the resulting electronic image generated by the watermark embedding device 200.

Specifically, having received the electronic version of the input image from the image input device 300, the image is ready for embedding with the visible watermark. In particular, a user selects, via the user input device 310, a watermark stored in the watermark storage device 240. Alternatively, a user can create or import a watermark, for example, based on a corporate logo or input texture or pattern, which is then stored in the watermark storage device 240. Having chosen a particular watermark, or introduced a new watermark into the watermark embedding system 200, a user determines which portion of the input image should be embedded with the visible watermark. Secondly, a determination is made as to what gray-scale range within the specified area should be modified in accordance with a correlation to the visible watermark. For example, in a 256 gray level image, the selected range of the gray value of the input image can be chosen, for example, between 160 and 200. Then, a determination is made as to what value to set the area within the range. For example, if the color value of the input image varies between 160 and 200, the values within the range can be replaced by, for example, the upper limit value of the range, say, 255. Alternatively, the values within the range can be replaced by the upper limit value of the input range. If the input range is chosen, for example, between 160 and 200, then the values within the range would be replaced with the upper limit value within that range, or, 200. In another alternative, the values within the range can be replaced by the lower limit value of the range. If the input range is chosen, for example, between 160 and 200, then the values within the range would be replaced with the lower limit value of the range, or, 0. In yet another alternative, if the input range is chosen, for example, between 160 and 200, then the values within the range would be replaced with the lower limit value of the input range, or, 160. These different alternatives will affect the appearance of the visible watermark in the output halftoned image, determining whether the visible watermark will appear to be brighter or darker than the background value of the image.

The halftone screen modifier 250, knowing the area and the range in which to embed the visible watermark, modifies the halftone screen in accordance with these parameters. Specifically, the halftone screen modifier 250 replaces the values within the selected range within a predetermined value. Thus, a modified halftone screen is generated such that when an input image value varies between the specified range, the area inside the specified area will show no difference from a constant input equal to the selected value. The background, or input image, which is outside the specified area, varies as to halftone output by the unmodified screen. The halftoning device 260 then halftones the input image based on the modified halftone screen. The modified halftone imagine, containing the embedded watermark can then be output to the image output device 320 over link 205 via the I/O interface 210.

The modification of halftone screens to incorporate a visible watermark also applies to color halftone screens used for color images. Such halftone screens may be designed for different separations. Some examples of such separations include three-color, red, green, and blue separations. Alternatively, these separations might include four-color, cyan, magenta, yellow and black separations. The number of separations is not limited to these examples and may include more than four or fewer than three separations.

In the case of a color image, there can be at least one halftone screen per separation. In such a case, this method of incorporating a visible watermark is applied to each halftone screen for each separation. The specified areas and selected ranges may be the same for each separation or they may vary from screen to screen. For example, if the same watermark area is specified in each halftone screen for each separation, but a different selected range is chosen, then the watermark will appear in different regions of the image in different colors depending on the manner in which background values of the different separations vary across the image. On the other hand, if the selected area is also different for different halftone screens for different separations, then the visible watermark will appear as different shapes in different colors depending on the manner in which background values of the different separations vary across the image.

Figure 3:
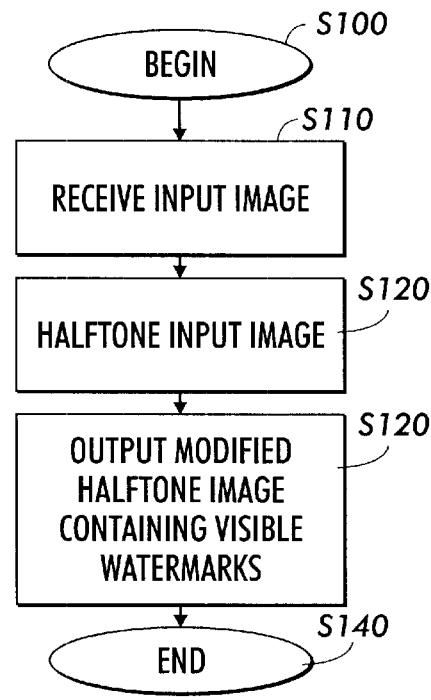
FIG. 3 is a flowchart outlining an exemplary watermark embedding process according to this invention.

FIG. 3 outlines the method according to this invention for embedding visible watermark into received images. Control begins in step S100 and continues to step S110. In step S110, an image is received. Next, in step S120, the input image is halftoned. Then, in step S130, the modified halftone image containing the visible watermarks is output. Control then continues to step S140 where the control sequence ends.

Figure 4:
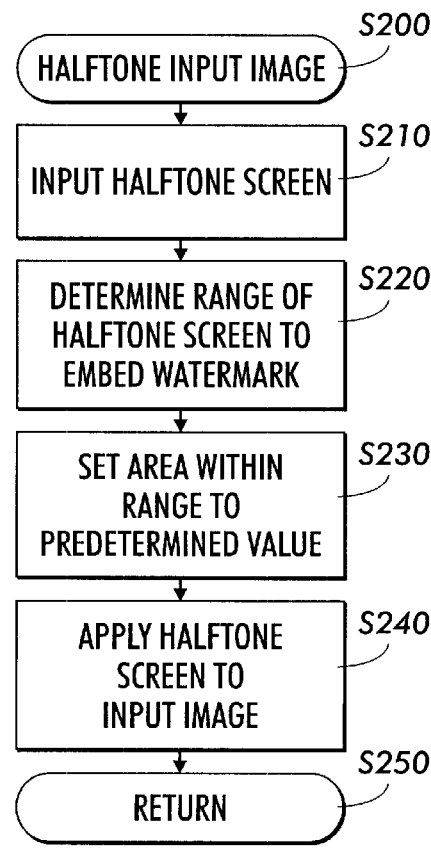
FIG. 4 is a flowchart outlining in greater detail the halftone input image step of FIG. 3.

FIG. 4 illustrates in greater detail the halftone image step of FIG. 3. Specifically, control begins in step S200 and continues to step S210. In step S210, the halftone screen is selected. Next, in step S220, the range within the halftone screen in which to embed the watermark is determined. Next, in step S230, the area within the range is set to a predetermined value. Then, in step S240, the modified halftone screen is applied to the input image. Control then continues to step S250 where the control sequence ends.

As shown in FIG. 2, the watermark embedding system is preferably implemented on a single program general purpose computer or separate programs general purpose computers. However, the watermark embedding system can also be implemented on a special purpose computer, a programmed microprocessor or microcontroller and peripheral integrated circuit element, an ASIC, or other integrated circuit, a digital signal processor, a hard-wired electronic or logic circuit such as a discrete element circuit, a programmable logic device such as a PLD, PLA, FPGA, PAL or the like. In general, any device capable of implementing a finite state machine that is in turn capable of implementing the flow charts shown in FIGS. 3–4 can be used to implement the watermark embedding system.

Furthermore, the disclosed method may be readily implemented in software using object or object-oriented software development environments that provide portable source code that can be used on a variety of computer or workstation hardware platforms. Alternatively, the disclosed watermark embedding system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The watermark embedding systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded in a personal computer, as a resource residing on a server or graphics workstation, as a routine embedded in a dedicated watermark embedding system, or the like. The watermark embedding system can also be implemented by physically incorporating the system and method into a software and/or hardware system, such as the hardware and software systems of a graphics workstation or dedicated watermark embedding system.

It is, therefore, apparent that there has been provided, in accordance with the present invention, systems and methods for embedding visible watermarks. While this invention has been described in conjunction with preferred embodiments thereof, it is evident that many alternatives, modifications and variations will be apparent to those skilled in the art. Accordingly, Applicants intend to embrace all such alternatives, modifications and variations that follow in the spirit and scope of this invention.

What is claimed is:

1. A system that embeds a visible watermark in an input image comprising:
   a halftone screen modifier that modifies a halftone screen having a set of threshold values, wherein the halftone screen modifier modifies at least one of the threshold values of the halftone screen based on at least one selected gray scale range of the input image; and
   a halftoning circuit that halftones the input image based on the modified halftone screen to embed the visible watermark.

2. The system of claim 1, wherein the halftone screen modifier selects at least one portion of the halftone screen corresponding to at least one location in the input image where the visible watermark is to be embedded.

3. The system of claim 2, wherein the halftone screen modifier modifies at least one threshold value of the halftone screen that is within the selected gray-scale range and is within the at least one portion of the input image that is to be embedded with the visible watermark.

4. The system of claim 3, wherein the halftone screen modifier sets the at least one threshold value of the halftone screen that is within the selected gray-scale range to a predetermined threshold.

5. The system of claim 1, wherein the input image is at least one of a color and a black and white image.

6. The system of claim 1, wherein the visible watermark is at least one of a logo, a texture, a symbol, a word, a letter, a pattern and a signature.

7. The system of claim 1, further comprising a watermark storage device that stores one or more visible watermarks.

8. The system of claim 1, wherein the input image is a color image and the visible watermark is embedded in one or more color separation layers of the input color image.

9. A method for embedding a visible watermark in an input image comprising:
   determining a portion of the input image to embed with the visible watermark;
   determining at least one gray-scale range of values within the determined portion of the input image;
   modifying a halftone screen based on the determined portion and the at least one gray-scale range of values; and
   halftoning the input image with the modified halftone screen.

10. The method of claim 9, wherein modifying the halftone screen comprises setting, to a predetermined value, at least one threshold value of the halftone screen that is within the at least one determined gray-scale range and is within the determined portion.

11. The method of claim 9, wherein the input image is at least one of a color and a black and white image.

12. The method of claim 9, wherein the visible watermark is at least one of a logo, a texture, a symbol, a word, a letter, a pattern and a signature.

13. The method of claim 9, further comprising inputting one or more visible watermarks from a watermark storage device.

14. The method of claim 9, further comprising embedding one or more visible watermarks into one or more color separation layers of an input color image.

15. An information storage medium for embedding a visible watermark in an input image comprising:
   information that determines a portion of the input image to embed with the visible watermark;
   information that determines at least one threshold of a halftone screen that is within at least one gray-scale range to modify;
   information that modifies a halftone screen based on the determined portion and the at least one gray-scale range; and
   information that halftones the input image with the modified halftone screen.

16. The information storage medium of claim 15, further comprising information that sets, to at least one predetermined value, the at least one threshold that is within the at least one gray-scale range and is within the determined portion.

17. The information storage medium of claim 15, wherein the input image is at least one of a color and a black and white image.

18. The information storage medium of claim 15, wherein the visible watermark is at least one of a logo, a texture, a symbol, a word, a letter, a pattern and a signature.

19. The information storage medium of claim 15, further comprising information that inputs one or more visible watermarks from a watermark storage device.

20. The information storage medium of claim 15, further comprising information that embeds one or more visible watermarks into one or more color separation layers of an input color image.

* * * * *